July 2, 1946.  A. GERHOLD  2,403,359

SCREW

Filed Oct. 5, 1944

INVENTOR
ALFRED GERHOLD
By
Atty.

Patented July 2, 1946

2,403,359

UNITED STATES PATENT OFFICE 2,403,359

SCREW

Alfred Gerhold, Westcliff-on-Sea, England

Application October 5, 1944, Serial No. 557,336
In Great Britain November 5, 1943

3 Claims. (Cl. 85—47)

This invention relates to screws, principally wood screws, of the kind wherein the nose of the screw shank is formed as a cutter intended to cut a passage into the material as the screw is screwed in, so that the threaded portion of the screw shank can follow down into said passage. The object of the present invention is to provide a screw with a cutter portion of improved form and which will be very effective in use so that in many cases it will be unnecessary to preform a hole in the material into which the screw is to be driven. A further object is to provide a screw having these characteristics and in which the cutter can be formed in a simple manner and without affecting the normal method of forming the screw thread. The term "screw" used herein includes devices of numerous kinds having screwed shanks, for instance screw hooks such as dresser hooks and coat hooks and screw eyes.

According to the invention there is formed in the nose of the screw a rectilinear groove obliquely inclined in relation to the screw shank, and reaching to, and leaving the screw with, a pointed extremity disposed in the proximity of its axis, the groove forming on the screw nose a blade capable of serving as a cutter when the screw is driven in by rotation.

In carrying out the invention the groove is so formed that its base reaches to, or slightly beyond a plane containing the axis of the screw, a wall of the groove reaching to, and leaving the screw with, a pointed extremity disposed in the proximity of its axis, the groove forming on the screw nose a substantially radially disposed blade adapted to serve as a cutter when driving in the screw by rotation.

Conveniently the groove may be of arcuate section; this will give the effect of a substantially radial cutter blade having a rake to improve the cutting action.

The groove meets and is partially cut off at one end by a valley of the normal screw thread; the width of the groove may be such that it reaches to the valley of the next upper convolution of the thread, and at this latter position the groove may be slightly incurved towards the axis of the screw, that is to say radiused off to flow into the valley base of said upper convolution, which latter the groove meets at a suitable angle. Conveniently the groove may be disposed at about forty-five degrees to the axis of the screw.

If the screw has no cut-away portion other than the groove then the cutter blade will have a V-shaped nose, one side being the operative side and the other the trailing side when driving the screw into the material. However, as an alternative to this, the portion of material between the axis and the trailing side may be cut away so that the inner edge of the cutter blade surface lies approximately on the axis of the screw.

In the accompanying drawing.

Figure 1:
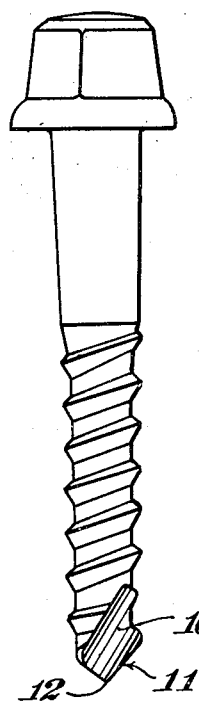
Figure 1 is an elevation of a screw of one convenient form in accordance with the invention.
Figure 2:
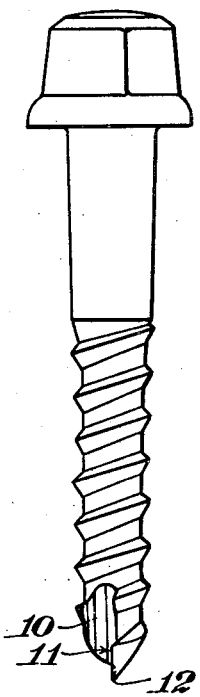
Figure 2 is a view similar to Figure 1, showing the same screw turned through a small angle.
Figure 3:
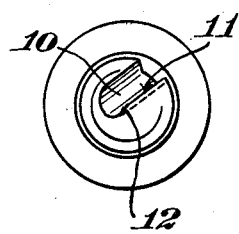
Figure 3 is an end view of said screw.

Referring firstly to Figures 1, 2 and 3, there is formed in the nose of the screw an obliquely disposed straight groove 10 of arcuate cross-section, the groove being of a depth to extend slightly beyond the axis of the screw. This provides the screw with a blade having an approximately radially disposed cutter face 11 which, by the curvature, is given a suitable rake for cutting. The cutter blade so formed has a V-shaped nose, the extremity 12 of which is disposed approximately at the axis of the screw.

Figure 4:
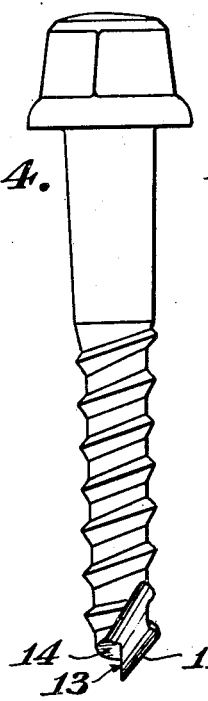
Figure 4 is an elevation of a screw of modified form.
Figure 5:
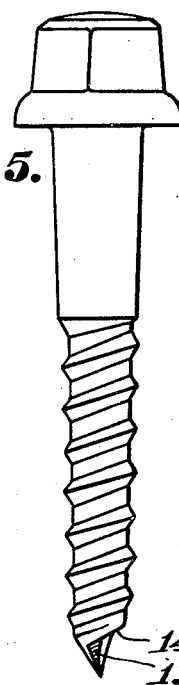
Figure 5 is an elevation of same in a plane at right angles to Figure 1.
Figure 6:
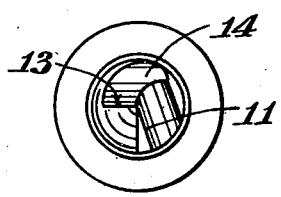
Figure 6 is an end view of said screw.

In the construction shown in Figures 4, 5 and 6 an additional portion is removed from the screw nose, namely at the trailing side of the blade, giving the blade face 11 an inner edge 13 which lies approximately on the axis of the screw. Thus in cross-section and end view (Figure 6) the blade has approximately a sector shape and may subtend an angle of about ninety degrees. From the top of the inner edge 13 of the blade the end of the screw may be shaped off helically as indicated by reference 14.

The groove 10 can be formed in the course of the normal method of making the screw or may be formed subsequently, for instance by making a straight milling cut.

In many cases it will be convenient to mould the screw, for instance when the article provided by the invention is a screw hook or screw eye, and in this case the groove will be formed in the course of the moulding operation so that no additional operation is involved. The invention contemplates the manufacture of the article in plastics as well as in metal, and in fact in any suitable material having the required strength in the finished product.

I claim:

1. A screw including a sharp-pointed nose having a single straight groove of arcuate section which is obliquely inclined in relation to the screw shank, said groove being disposed to form said nose with a substantially radial and undercut cutting face the undercut of which affords a rake to a cutting edge of said face, the said raked cutting edge extending to the point of the nose and acting to cut away material when driving in the screw by rotation.

2. A screw including a sharp-pointed nose having a single straight groove of arcuate section which is obliquely inclined in relation to the screw shank, said groove reaching beyond a plane containing the axis of the screw and being disposed to form said nose with a substantially radial and undercut cutting face the undercut of which affords a rake to a cutting edge of said face, the said raked cutting edge extending to the point of the nose and acting to cut away material when driving in the screw by rotation.

3. A screw including a sharp-pointed nose having a single straight groove of arcuate section which is obliquely inclined in relation to the screw shank, said groove being disposed to form said nose with a substantially radial and undercut cutting face the undercut of which affords a rake to a cutting edge of said face, the said raked cutting edge extending to the point of the nose and being met at such point by the vertical edge of a cut-away portion at the outer end of the groove, said construction providing a cutter blade of sector shape having a raked leading edge which acts to cut away material when driving in the screw by rotation.

ALFRED GERHOLD.